United States Patent
Kezobo et al.

(10) Patent No.: US 8,626,394 B2
(45) Date of Patent: Jan. 7, 2014

(54) ELECTRIC POWER STEERING CONTROL DEVICE

(75) Inventors: Isao Kezobo, Tokyo (JP); Masahiko Kurishige, Tokyo (JP); Masaya Endo, Tokyo (JP); Takayuki Kifuku, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/497,103

(22) PCT Filed: Oct. 21, 2010

(86) PCT No.: PCT/JP2010/068574
§ 371 (c)(1),
(2), (4) Date: Mar. 20, 2012

(87) PCT Pub. No.: WO2011/052470
PCT Pub. Date: May 5, 2011

(65) Prior Publication Data
US 2012/0185132 A1 Jul. 19, 2012

(30) Foreign Application Priority Data
Oct. 30, 2009 (JP) .................................. 2009-250874

(51) Int. Cl.
*B62D 5/08* (2006.01)
(52) U.S. Cl.
USPC .................. 701/41; 701/1; 701/22; 701/31.4; 180/443; 180/444; 318/400.22
(58) Field of Classification Search
USPC ............. 701/31.4, 36, 41, 42, 1, 22; 180/443, 180/444, 446; 318/400.22, 609
See application file for complete search history.

(56) References Cited

U.S. PATENT DOCUMENTS

| | | | | |
|---|---|---|---|---|
| 5,001,636 A | * | 3/1991 | Shiraishi et al. | 701/41 |
| 6,219,604 B1 | * | 4/2001 | Dilger et al. | 701/41 |
| 6,301,534 B1 | * | 10/2001 | McDermott et al. | 701/41 |

(Continued)

FOREIGN PATENT DOCUMENTS

| | | |
|---|---|---|
| JP | 2838053 | 12/1998 |
| JP | 2005 319971 | 11/2005 |

(Continued)

OTHER PUBLICATIONS

International Search Report Issued Dec. 7, 2010 in PCT/JP10/68574 Filed Oct. 21, 2010.

*Primary Examiner* — Tuan C. To
*Assistant Examiner* — Yuri Kan
(74) *Attorney, Agent, or Firm* — Oblon, Spivak, McClelland, Maier & Neustadt, L.L.P.

(57) ABSTRACT

An electric power steering control device includes: a vibration extracting filter for performing filter processing on a rotation speed of a motor so as to reduce a gain on a low frequency side so as to output a vibration-component signal; a current variable gain map for detecting a current flowing through the motor as a first state quantity so as to calculate a current variable gain based on the current; a rotation-speed variable gain map for detecting the rotation speed of the motor as a second state quantity so as to calculate a rotation-speed variable gain based on the rotation speed; a correction mechanism calculating a vibration suppression current; and current controller calculating a target current so as to control the current flowing through the motor.

9 Claims, 12 Drawing Sheets

(56) References Cited

U.S. PATENT DOCUMENTS

| | | | |
|---|---|---|---|
| 7,379,802 B2* | 5/2008 | Kasbarian et al. | 701/36 |
| 7,684,912 B2* | 3/2010 | Nishimura | 701/41 |
| 8,180,529 B2* | 5/2012 | Suzuki | 701/41 |
| 8,224,528 B2* | 7/2012 | Hayama et al. | 701/42 |
| 8,267,220 B2* | 9/2012 | Sugiyama et al. | 180/446 |
| 8,346,435 B2* | 1/2013 | Kurishige et al. | 701/41 |
| 2004/0148080 A1* | 7/2004 | Ekmark et al. | 701/41 |
| 2005/0038576 A1* | 2/2005 | Hara et al. | 701/22 |
| 2006/0052908 A1* | 3/2006 | Matsumoto et al. | 701/1 |
| 2007/0205041 A1* | 9/2007 | Nishizaki et al. | 180/446 |
| 2008/0066991 A1* | 3/2008 | Kataoka et al. | 180/443 |
| 2008/0191655 A1* | 8/2008 | Ueda et al. | 318/609 |
| 2008/0296085 A1* | 12/2008 | Suzuki | 180/444 |
| 2009/0000857 A1* | 1/2009 | Sugiyama et al. | 180/444 |
| 2009/0024280 A1* | 1/2009 | Kato et al. | 701/41 |
| 2009/0079373 A1* | 3/2009 | Nagase et al. | 318/400.22 |
| 2009/0125186 A1* | 5/2009 | Recker et al. | 701/41 |
| 2009/0240389 A1* | 9/2009 | Nomura et al. | 701/29 |
| 2010/0198461 A1* | 8/2010 | Burton et al. | 701/41 |
| 2012/0185132 A1* | 7/2012 | Kezobo et al. | 701/41 |

FOREIGN PATENT DOCUMENTS

| | | |
|---|---|---|
| JP | 2006 137341 | 6/2006 |
| JP | 2007 331706 | 12/2007 |
| JP | 2008 296877 | 12/2008 |
| JP | 2009 29267 | 2/2009 |

* cited by examiner (a) ASSIST MAP (b) AUXILIARY TORQUE CURRENT-ASSIST MAP GRADIENT (c) STEERING TORQUE-ASSIST MAP GRADIENT

FIG. 8
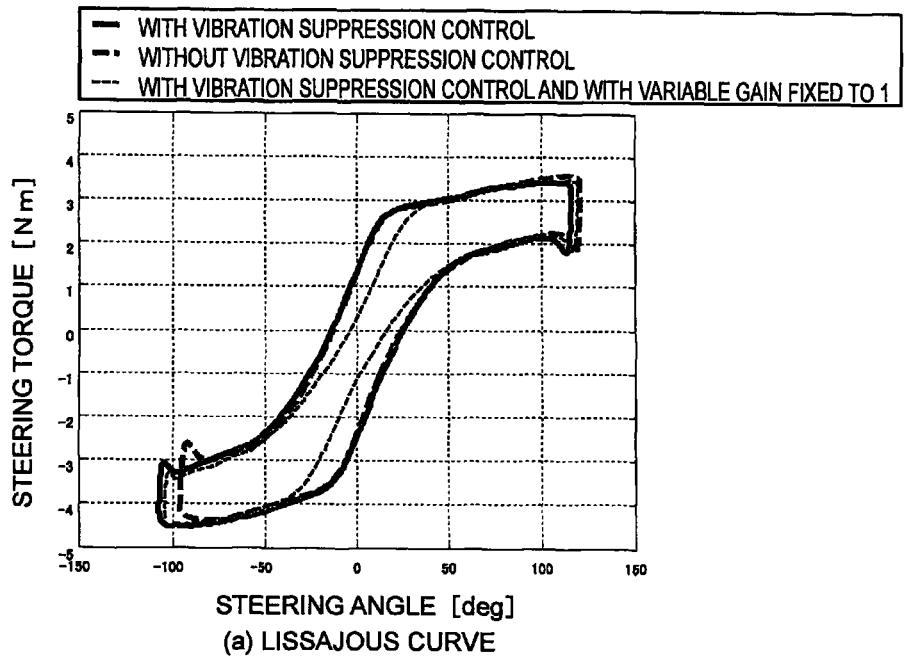
(a) LISSAJOUS CURVE
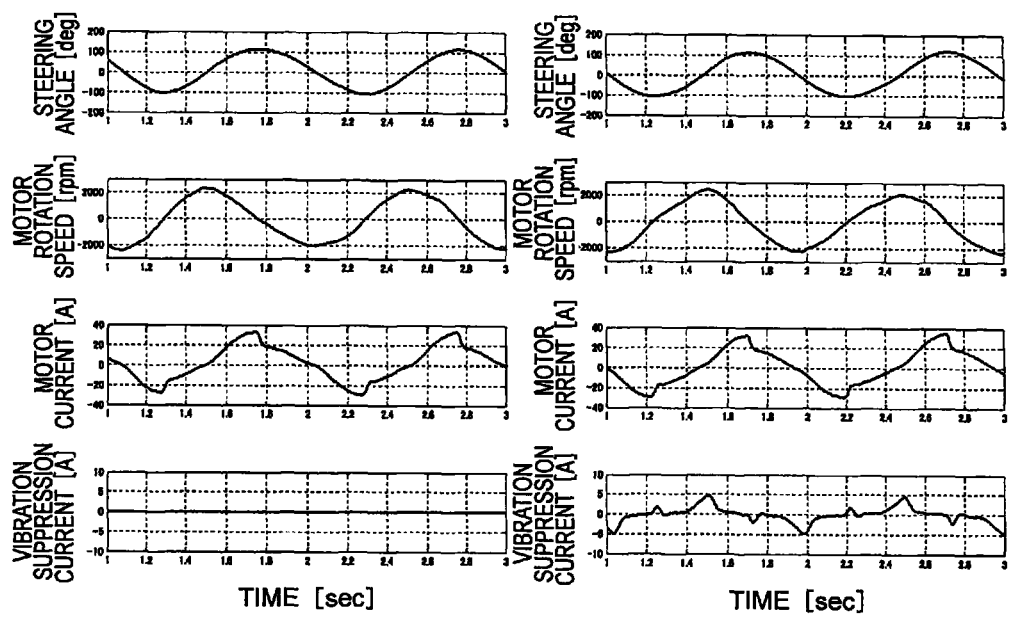
(b) TIME WAVEFORMS "WITH VIBRATION SUPPRESSION CONTROL"
(c) TIME WAVEFORMS "WITH VIBRATION SUPPRESSION CONTROL AND WITH VARIABLE GAIN FIXED TO 1"

FIG. 9
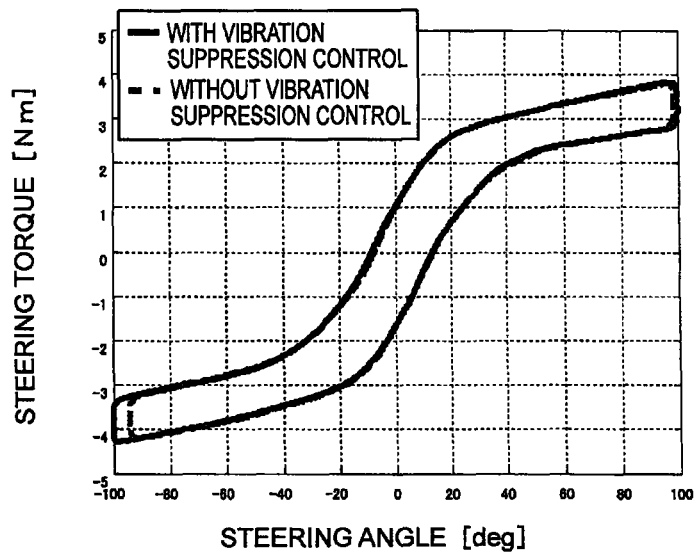
(a) LISSAJOUS CURVE
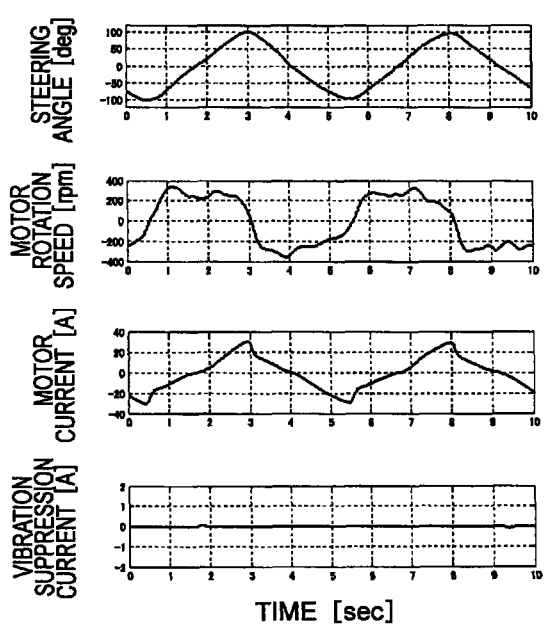
(b) TIME WAVEFORMS "WITH VIBRATION
SUPPRESSION CONTROL"

FIG. 10
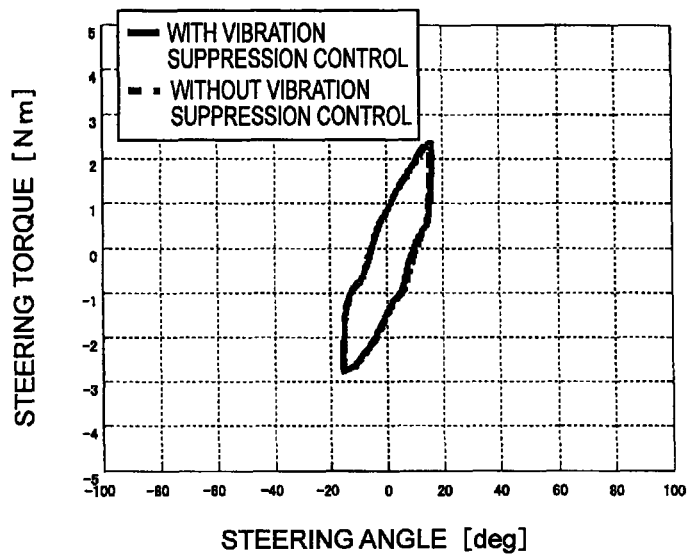
(a) LISSAJOUS CURVE
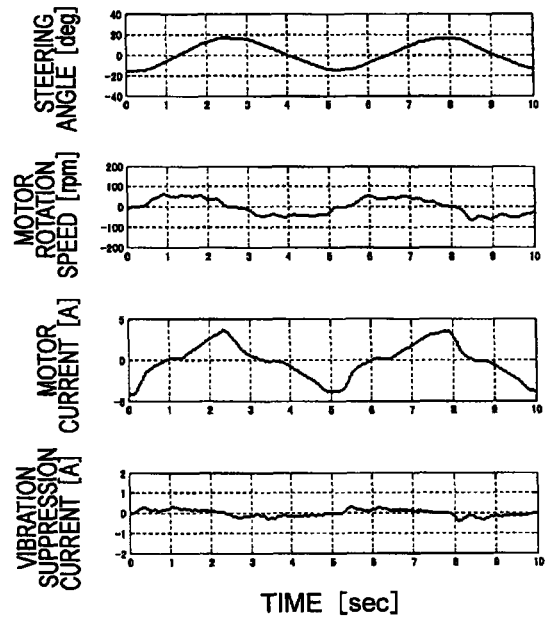
(b) TIME WAVEFORMS "WITH VIBRATION SUPPRESSION CONTROL"

ELECTRIC POWER STEERING CONTROL DEVICE

TECHNICAL FIELD

The present invention relates to an electric power steering control device for assisting a steering force of a driver of an automobile, and more particularly, to an electric power steering control device for suppressing a vibration due to a disturbance or the like.

BACKGROUND ART

In general, in an electric power steering control device, an assist torque which is approximately proportional to a steering torque is determined. A torque proportional gain indicating the proportional relation is set large. In this manner, a steering torque of a driver of an automobile is reduced, while an appropriate steering feeling is given. Further, in the electric power steering control device, a vibration due to a cogging torque generated by a motor, pulsations generated in synchronization with teeth of a gear, a disturbance transmitted from a road surface, and the like are required to be suppressed to improve a feeling (vibration feeling) of the driver.

As the conventional electric power steering control device for achieving the object described above, there is known an electric power steering control device including a low-pass filter (LPF) and a high-pass filter (HPF) (for example, see Patent Literature 1). Then, a steering component is extracted by the LPF to perform assist torque control. Then, a high-frequency vibration component is extracted by the HPF. Another controller (another gain) different from that for the low frequency is used for the extracted component to perform control.

As another conventional electric power steering control device, there is known an electric power steering control device which relates to control for suppressing the transmission of a disturbance such as a brake vibration input from a tie rod, which is connected to a wheel, to a steering wheel (for example, see Patent Literature 2). In Patent Literature 2, a configuration as follows is adopted to reduce the effects on steering control. Specifically, for a steering-torque signal, a steering component is attenuated by using the HPF of second or higher order. Further, through use of the signal as an input, a control amount is computed by a control-amount map having a large dead zone. In this manner, the steering component is reduced.

Moreover, the configuration includes three gain maps respectively based on a steering torque, a steering speed, and a vehicle speed so that the steering component is further reduced by setting the control amount to zero when the steering torque is large, the steering speed is large, or the vehicle speed is low.

CITATION LIST

Patent Literature

[PTL 1]: JP 2838053 B
[PTL 2]: JP 2006-137341 A

SUMMARY OF INVENTION

Technical Problem

However, the related technologies have the following problems.

In the electric power steering control device described in Patent Literature 1, the high-pass filter (HPF) is used to extract a vibration component such as the disturbance. Here, for example, the case where a frequency band of the cogging torque generated by the motor is low and is close to about 5 Hz or lower, which corresponds to a frequency at which the driver performs steering, is considered. In this case, the vibration component and the steering component cannot be sufficiently separated from each other. Hence, there is a problem in that the vibration is not sufficiently reduced or the effects on the steering are generated to degrade the steering feeling.

Further, in the electric power steering control device described in Patent Literature 2, the HPF of the high order equal to or higher than the second order is required to be used for the filter for reducing the steering component to extract the vibration. Further, three gain maps are required to be individually provided for the steering torque, the steering speed, and the vehicle speed. Therefore, a computation amount is large and is complex. Further, the control-amount map has the large dead zone. Therefore, the vibration cannot be reduced to be smaller than a width of the dead zone. Specifically, the vibration cannot be suppressed to such an extent that the driver does not perceive the vibration.

In addition, in the electric power steering control device described in Patent Literature 2, the gain maps are not configured in view of a transmission characteristic at the time of transmission of the disturbance such as the cogging torque or the pulsations in synchronization with the gear teeth to the steering wheel. Therefore, the steering component is required to be reduced by the complex configuration with a large computation amount, such as the dead zone provided to the control-amount map or the use of three gain maps.

The present invention has been made to solve the problems described above, and therefore, has an object to provide an electric power steering control device capable of reducing a vibration component such as a cogging torque generated by a motor or the like without affecting steering to prevent a steering feeling from being degraded.

Solution to Problems

An electric power steering control device according to an exemplary embodiment of the present invention includes: an assist map for outputting an assist torque current based on a steering torque applied to a steering wheel by a driver; a vibration extracting filter for performing filter processing on the steering torque or a rotation speed of a motor for generating an assist torque to reduce a gain on a low frequency side so as to output a vibration-component signal; a current variable gain map for detecting a current flowing through the motor as a first state quantity so as to calculate a current variable gain based on the current; a rotation-speed variable gain map for detecting the rotation speed of the motor or a rotation speed of the steering wheel as a second state quantity so as to calculate a rotation-speed variable gain based on the rotation speed; correction means for calculating a vibration suppression current based on the vibration-component signal, the current variable gain, and the rotation-speed variable gain; and current control means for calculating a signal obtained by correcting the assist torque current with the vibration suppression current as a target current so as to control the current flowing through the motor.

Further, an electric power steering control device according to an exemplary embodiment of the present invention includes: an assist map for outputting an assist torque current based on a steering torque applied to a steering wheel by a driver; a vibration extracting filter for performing filter processing on the steering torque or a rotation speed of a motor for generating an assist torque to reduce a gain on a low frequency side so as to output a vibration-component signal; a gradient variable gain map for detecting a gradient of the assist torque current with respect to the steering torque on the assist map as a third state quantity so as to output a gradient variable gain based on the gradient; a rotation-speed variable gain map for detecting the rotation speed of the motor or a rotation speed of the steering wheel as a second state quantity so as to output a rotation-speed variable gain based on the rotation speed; correction means for calculating a vibration suppression current based on the vibration-component signal, the gradient variable gain, and the rotation-speed variable gain; and current control means for calculating a signal obtained by correcting the assist torque current with the vibration suppression current as a target current so as to control a current flowing through the motor.

Advantageous Effects of Invention

The electric power steering control device of the present invention has the configuration for obtaining the vibration suppression current by correcting the temporary vibration suppression current calculated through an intermediation of the vibration extraction filter with the variable gain calculated in accordance with the steering torque or the state quantity of the motor, and hence a disturbance of a frequency, which contains a component in a steering frequency band, can be sufficiently suppressed while the effects on a steering feeling are eliminated. As a result, the electric power steering control device capable of reducing the vibration component such as the cogging torque generated by the motor or the like without affecting the steering to prevent the steering feeling from being degraded can be obtained.

BRIEF DESCRIPTION OF DRAWINGS

FIG. 8 Diagrams showing a Lissajous curve of a steering angle and a steering torque, which corresponds to a curve showing a basic characteristic of a steering feeling, and time waveforms corresponding thereto, according to Embodiment 1 of the present invention.

FIG. 9 Diagrams showing a Lissajous curve of the steering angle and the steering torque, which corresponds to the curve showing the basis characteristic of the steering feeling, and time waveforms corresponding thereto, according to Embodiment 1 of the present invention.

FIG. 10 Diagrams showing a Lissajous curve of the steering angle and the steering torque, which corresponds to the curve showing the basis characteristic of the steering feeling, and time waveforms corresponding thereto, according to Embodiment 1 of the present invention.

DESCRIPTION OF EMBODIMENTS

Hereinafter, an electric power steering control device according to preferred embodiments of the present invention is described with reference to the drawings.

Embodiment 1

Figure 1:
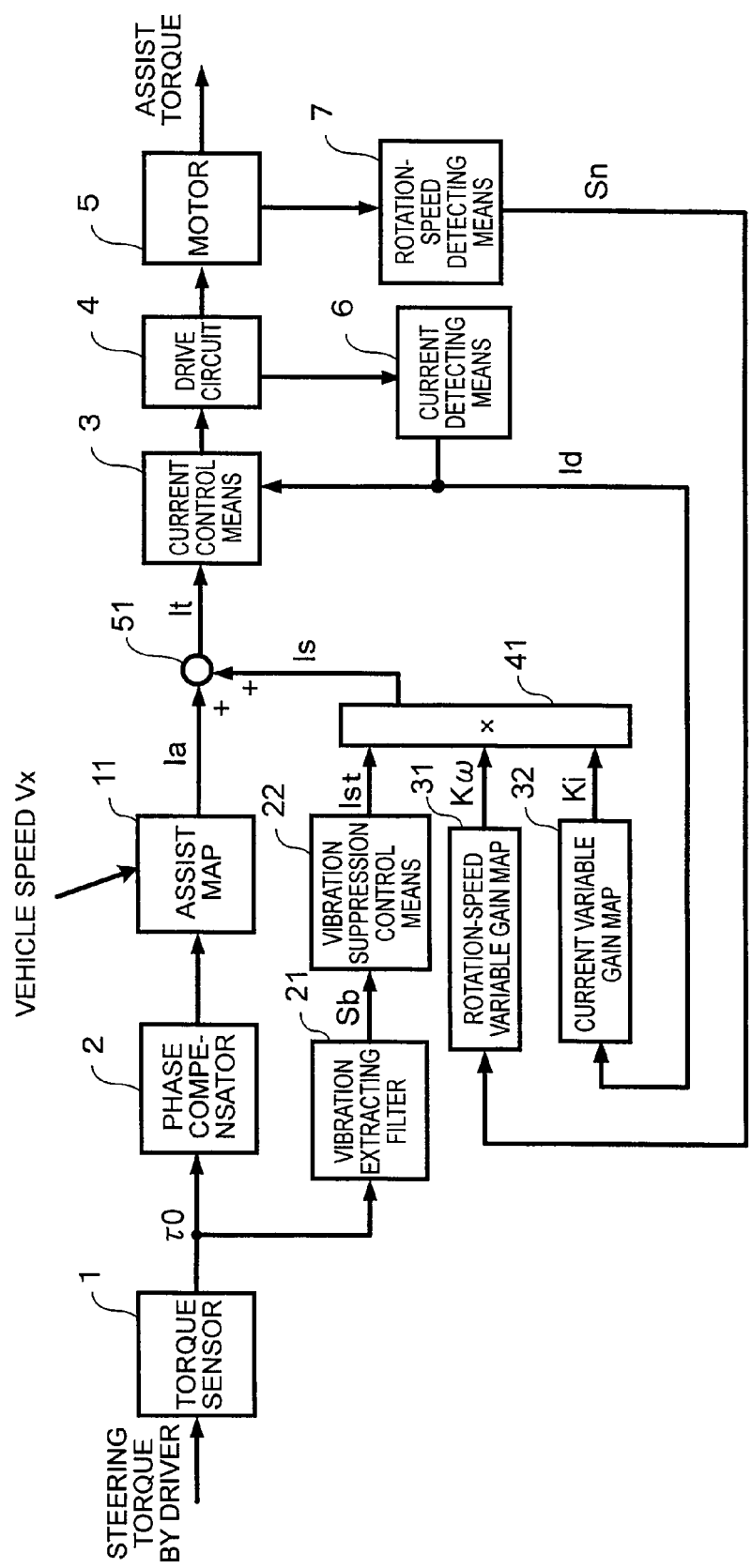
FIG. 1 A block line diagram illustrating a configuration of an electric power steering control device according to Embodiment 1 of the present invention.

FIG. 1 is a block line diagram illustrating a configuration of an electric power steering control device according to Embodiment 1 of the present invention. Although the detailed description of the electric power steering device itself is herein omitted, an electric power steering device having an already known configuration may be used. For example, those described in Patent Literatures 1 and 2 cited above can be referred to.

In FIG. 1, a torque sensor 1 detects a steering torque $\tau 0$ generated when a driver performs steering by using a known torsion bar or the like. Then, a phase compensator 2 advances a phase in the vicinity of an oscillation frequency based on an output of the torque sensor 1 so as to earn a stability margin with respect to an oscillating vibration which is likely to be generated when a feedback gain is increased by an assist map 11 provided in a subsequent stage.

Figure 2:
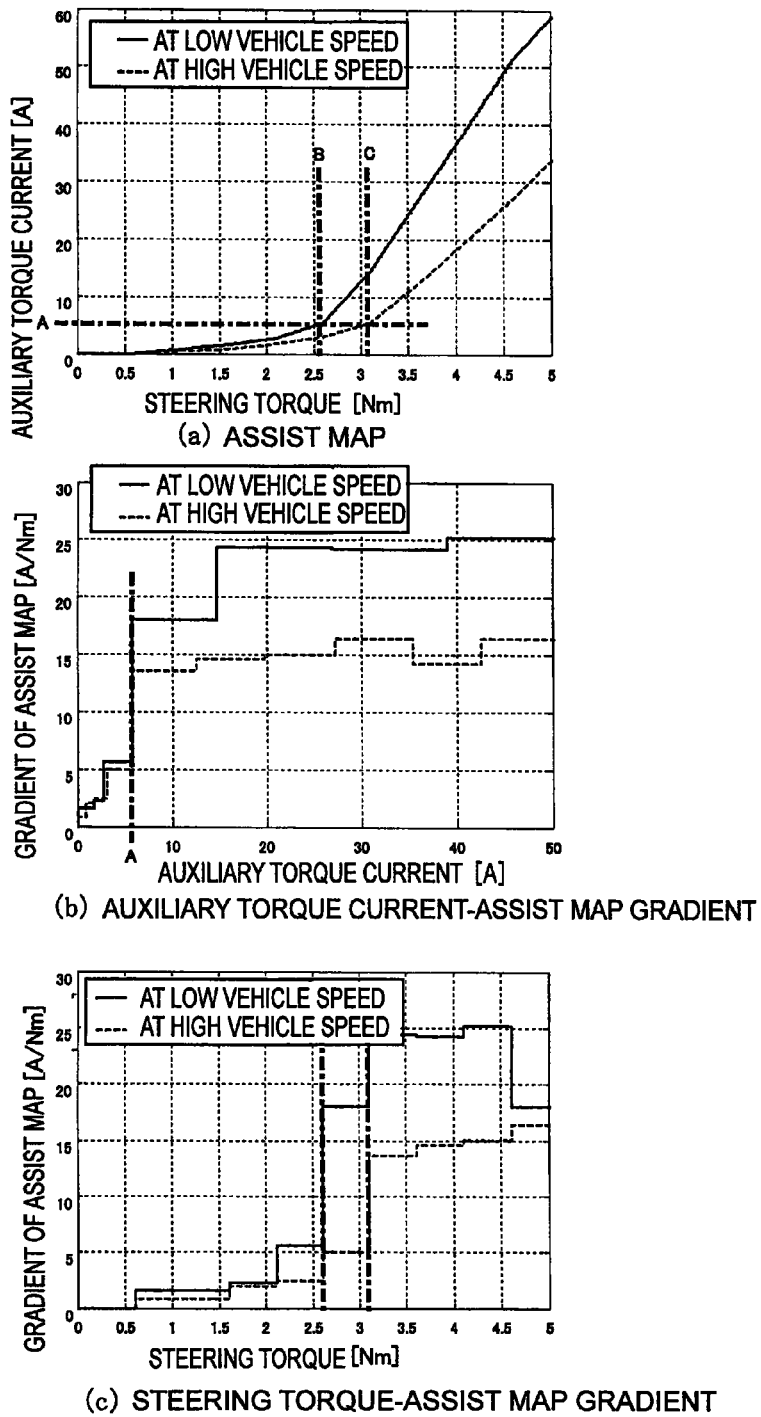
FIG. 2 An input/output characteristic view showing an assist map and graphs showing gradients thereof according to Embodiment 1 of the present invention.

FIG. 2 are an input/output characteristic view showing an assist map and graphs showing gradients thereof according to Embodiment 1 of the present invention. More specifically, FIG. 2(*a*) shows input/output characteristics of the steering torque corresponding to an input and an assist torque current corresponding to an output as the assist map. FIG. 2(*b*) shows the relations of an assist map gradient with respect to the assist torque current. FIG. 2(*c*) shows the relations of the assist map gradient with respect to the steering torque. The assist map 11 has the input/output characteristics as shown in FIG. 2(*a*), and uses the steering torque $\tau 0$ after the phase compensation, which is output from the phase compensator 2, as the input to output an assist torque current Ia to be supplied to a motor 5.

A vehicle speed Vx corresponding to a signal obtained by detecting a speed of a vehicle is also input to the assist map 11. As a result, the input/output characteristic of the assist map, which is used for outputting the assist torque current Ia, is changed in accordance with the vehicle speed. In FIG. 2(*a*), two cases, that is, the case where the vehicle speed is high and the case where the vehicle speed is low, are exemplarily shown. Therefore, the assist map 11 uses the steering-torque signal τ0 which is phase-compensated by the phase compensator 2 as the input to calculate the assist torque current Ia corresponding to an output signal based on the characteristic as shown in FIG. 2, which varies in accordance with the vehicle speed Vx.

Rotation-speed detecting means 7 detects a rotation speed of the motor 5 as a feedback signal. Further, current detecting means 6 detects a current Id flowing through the motor 5.

Figure 3:
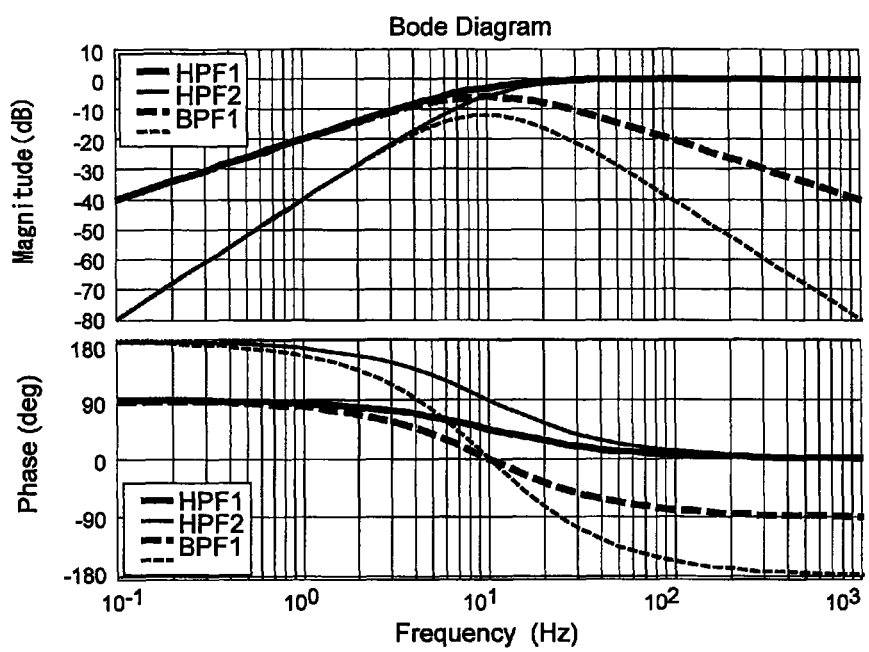
FIG. 3 Frequency characteristics of vibration extracting filters according to Embodiment 1 of the present invention.

Next, a vibration extracting filter 21 filters the steering-torque signal τ0 from the torque sensor 1 to reduce a steering component from the steering-torque signal so as to extract a vibration-component signal Sb. FIG. 3 shows frequency characteristics of the vibration extracting filters according to Embodiment 1 of the present invention. Next, vibration suppression control means 22 computes a temporary vibration suppression current Ist based on the vibration-component signal Sb extracted by the vibration extracting filter 21. A method of configuring the vibration extracting filter 21 and the functions of the vibration suppression control means 22 are described in detail below.

Figure 4:
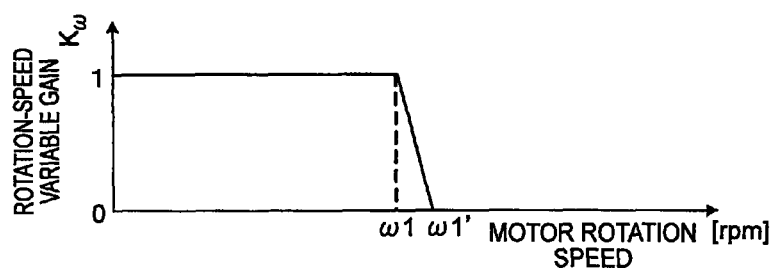
FIG. 4 An input/output characteristic view showing a rotation-speed variable gain map according to Embodiment 1 of the present invention.

Next, a rotation-speed variable gain map 31 and a current variable gain map 32 corresponding to variable gain maps of Embodiment 1 are described. The rotation-speed variable gain map 31 outputs a rotation-speed variable gain Kω based on a rotation-speed signal Sn (corresponding to a second state quantity) detected by the rotation-speed detecting means 7. FIG. 4 is an input/output characteristic view showing the rotation-speed variable gain map of Embodiment 1 of the present invention. The rotation-seed variable gain map 31 includes input/output characteristic data as shown in FIG. 4 and outputs the rotation-speed variable gain Kω based on the rotation-speed signal Sn.

Figure 5:
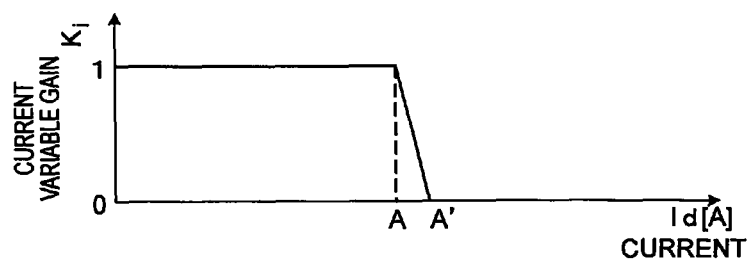
FIG. 5 An input/output characteristic view showing a current variable gain map according to Embodiment 1 of the present invention.

The current variable gain map 32 outputs a current variable gain Ki based on the current Id (corresponding to a first state quantity) detected by the current detecting means 6. FIG. 5 is an input/output characteristic view showing the current variable gain map of Embodiment 1 of the present invention. The current variable gain map 32 includes input/output characteristic data as shown in FIG. 5 and outputs the current variable gain Ki based on the current Id. The specific contents of the rotation-speed variable gain map 31 and the current variable gain map 32 are described in detail below.

Next, a multiplier 41 (corresponding to correction means) multiplies the temporary vibration suppression current Ist by the rotation-speed variable gain Kω and the current variable gain Ki to compute a vibration suppression current Is. Then, an adder 51 adds the assist torque current Ia corresponding to the output of the assist map 11 and the vibration suppression current Is corresponding to the output of the multiplier 41 to obtain a target current It corresponding to a current to be realized in the motor 5.

Next, current control means 3 performs current control so that the current Id detected by the current detecting means 6 becomes identical with the target current It computed by the adder 51. As an example, the current control means 3 outputs a voltage command signal Sv such as a PWM signal to a drive circuit 4 including, for example, an H-bridge circuit or an inverter circuit, thereby outputting a driving current corresponding to the PWM signal to the motor 5. In response thereto, the motor 5 generates an assist torque which assists a steering force to a steering shaft, which is generated by the driver.

Blocks constituting the control device illustrated in FIG. 1 are not all configured by hardware. In Embodiment 1, a configuration up to the computation of the target current It by the adder 51 from the output torque signal τ0 of the torque sensor 1 and the signal Sn detected by the rotation-speed detecting means 7 or up to the voltage command signal Sv is configured by software with a microcomputer.

The microcomputer includes a known central processing unit (CPU), a read-only memory (ROM), a random-access memory (RAM), an interface (IF), and the like. Programs stored in the ROM are sequentially extracted to perform a desired computation in the CPU, and the result of computation is temporarily stored in the RAM and the like. In this manner, the software is executed to perform a predetermined control operation.

Next, the functions of the vibration extracting filter 21 and the vibration suppression control means 22 for obtaining the temporary vibration suppression current Ist and the functions of the rotation-speed vibration gain map 31 and the current variable gain map 32 for calculating an appropriate gain in accordance with the state quantities are described in detail.

First, the vibration extracting filter 21 is described in detail. The vibration extracting filter 21 has properties of a high-pass filter (HPF) or a bandpass filter (BPF) as shown in FIG. 3 mentioned above. Specifically, a gain is small on the low-frequency side, thereby reducing the magnitude of the output signal.

On the high-frequency side, in the case of the HPF, the input signal is allowed to pass therethrough while the gain is scarcely lowered. The passage characteristics of the HPF as described above are indicated by HPF1 and HPF2 of FIG. 3.

On the other hand, in the case of the BPF, the input signal is allowed to pass therethrough almost while the gain is scarcely lowered in the vicinity of a filter frequency fc. At a higher frequency, the gain is lowered. In this manner, an undesired noise component is eliminated. The passage characteristics of the BPF as described above are indicated by BPF1 and BPF2 of FIG. 3.

In FIG. 3, HPF1 is a first-order HPF, whereas HPF2 is a second-order HPF. Moreover, BPF1 is a BPF including a first-order HPF and an LPF, whereas BPF2 is a BPF including a second-order HPF and the LPF.

The filter frequencies fc of the filters shown in FIG. 3 are all set to 10 Hz. In the vicinity of 1 Hz on the lower frequency side, the gain is slightly lowered, although the phase tends to advance. Therefore, by using the filter, the effects of suppressing a vibration due to a disturbance at about 1 to 20 Hz are obtained. The suppression effects are described below with reference to FIG. 7.

Further, as shown in FIG. 3, as the order of the filter becomes higher, a gradient of the characteristic becomes steeper. However, the first order is sufficient. In the case where the steering component at the low frequency or the noise component at the high frequency is desired to be further reduced, the filter of second or higher order may be used.

Moreover, as shown in FIG. 3, although the phase advances even in the vicinity of the filter frequency fc in the case of the HPF, the phase does not advance in the vicinity of the filter frequency fc when the BPF is used. In general, however, it is not necessary to advance the phase to suppress the vibration due to the disturbance in a relatively low frequency band which is lower than a system band. In such a case, the effects of suppressing the disturbance become even higher as the gain becomes larger. In Embodiment 1, the first-order HPF as indicated by HPF1 of FIG. 3 is used.

Figure 6:
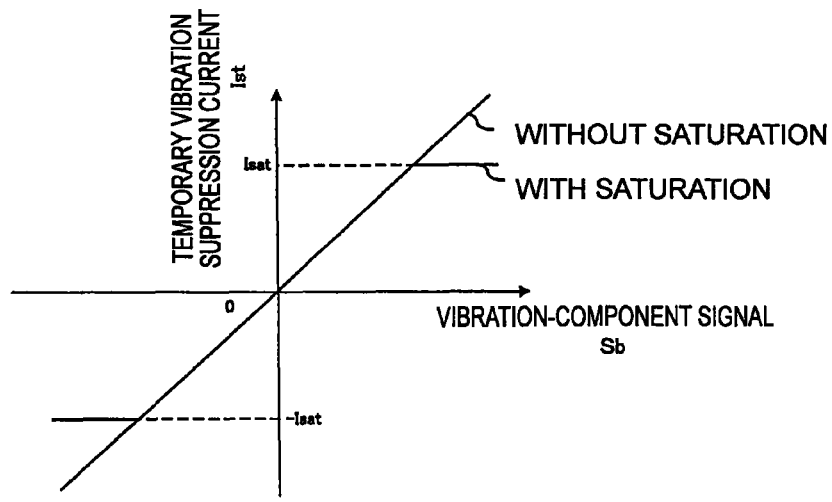
FIG. 6 An input/output characteristic view showing vibration suppression control means according to Embodiment 1 of the present invention.

Next, the vibration suppression control means 22 is described. FIG. 6 is an input/output characteristic view showing the vibration suppression control means of Embodiment 1 of the present invention. The vibration suppression control means 22 basically includes a proportional gain and computes the temporary vibration suppression current Ist so as to correspond to the vibration-component signal Sb extracted by the vibration extracting filter 21. As shown in FIG. 6, a characteristic of saturating the vibration-component signal to a constant value when the vibration-component signal Sb corresponding to the input signal is large may be included. In this case, for example, the saturation is performed with an amplitude Isat corresponding to a target vibration. In this manner, a signal larger than a target vibration amplitude is limited so as to enable the reduction of the effects on a steering feeling.

However, the vibration suppression control means 22 in Embodiment 1 does not have a dead zone having a property in which the output value becomes zero, in the vicinity of a point of origin. In the case where there is a dead zone in which the output value is set to zero, the output signal becomes zero with respect to a vibration amplitude in the range thereof, and hence the vibration cannot be suppressed to a width of the dead zone or smaller. Although the presence of the dead zone is advantageous in view of the reduction of the effects on the steering, the effects on the steering can be removed by another configuration such as the variable gain map in Embodiment 1. Therefore, the dead zone is not provided to the vibration suppression control means 22.

Next, the rotation-speed variable gain map 31 is described. As described above referring to FIG. 4, the output is set to 1 in the region where an absolute value of the rotation-speed signal is small (corresponding to $\omega 1$ or smaller in FIG. 4). On the other hand, in the region where the absolute value of the rotation-speed signal is large, the rotation-speed variable gain $K\omega$ is gradually reduced to be zero at a given motor rotation speed (corresponding to $\omega 1'$ in FIG. 4).

Figure 7:
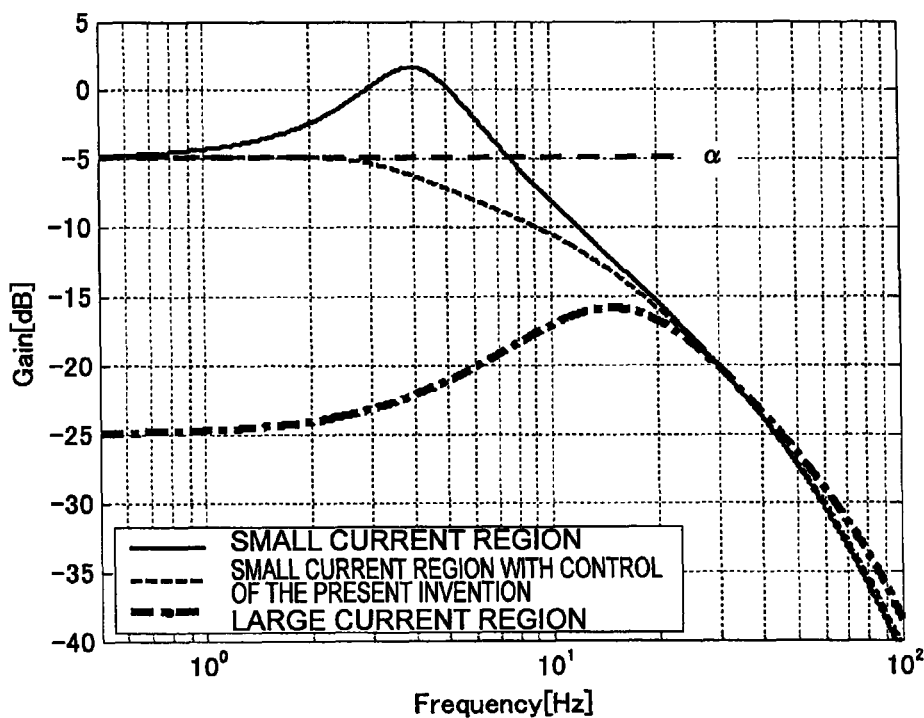
FIG. 7 A diagram exemplifying disturbance transmission characteristics according to Embodiment 1 of the present invention.

In the region where the rotation speed is high, the vibration due to the disturbance is reduced to be sufficiently small even when the vibration suppression current is set to zero. This fact is described using disturbance transmission characteristics shown in FIG. 7. FIG. 7 is an exemplary view of disturbance transmission characteristics in Embodiment 1 of the present invention and shows the effects of suppressing the vibration due to the disturbance in Embodiment 1.

The disturbance transmission characteristics shown in FIG. 7 are frequency characteristics showing an amplification factor of transmission from a disturbance torque applied to the steering shaft (not shown) to which the motor is mounted to a torque (specifically, a torque perceived by the driver) at a steering wheel gripped by the driver. Although the characteristics differ depending on a mechanism of the electric power steering device, the motor, and the like, the characteristics basically have a tendency as shown in FIG. 7.

It is generally known that the disturbance such as the cogging torque generated by the motor or the pulsations generated in synchronization with the teeth of the gear of the electric power steering device has a frequency which becomes higher in proportion to the steering speed. The disturbance transmission characteristics shown in FIG. 7 show that the gain is small in a band in which the frequency of the disturbance is high (corresponding to a band at approximately 8 Hz or higher in the example shown in FIG. 7) even without the vibration suppression control as indicated by the solid line of FIG. 7 and therefore, the torque vibration at the steering wheel is reduced to be sufficiently small.

For example, in the case where the disturbance is the cogging torque, the rotation speed of the motor corresponds to the range in which the steering speed is approximately larger than the vicinity of 50 to 100 rpm. In such a range, the disturbance transmission characteristic becomes smaller than a line a (corresponding to a gain of −5 dB) shown in FIG. 7 and is at the level at which the driver scarcely perceives the cogging torque. Therefore, to cope with the cogging torque, $\omega 1$ shown in FIG. 4 referred to above is set to about 50 to 100 rpm. The value $\omega 1'$ of the motor rotation speed at the time when the rotation-speed variable gain $K\omega$ becomes 0 is set close to $\omega 1$ as long as the driver does not perceive a sudden change in the variable gain. For example, the value may be set to about 1.5 times as large as $\omega 1$.

Next, the current variable gain map 32 is described. As described above referring to FIG. 5, in the region where an absolute value of the current Id is small (corresponding to a region with A or smaller shown in FIG. 5), the current variable gain Ki is set to 1. On the other hand, in the region where the absolute value of the current is large, the current variable gain Ki is gradually reduced so as to be zero at a given current Id (corresponding to A' shown in FIG. 5).

In the region where the current is large, the vibration due to the disturbance can be suppressed to be sufficiently small even when the vibration suppression current is set to zero. This fact is described using the disturbance transmission characteristics shown in FIG. 7. A characteristic at a large current, which is indicated by the alternate long and short dash line shown in FIG. 7, shows that the gain is small and therefore, the torque vibration at the steering wheel is reduced to be sufficiently small even when the vibration suppression control is not performed. The characteristic at a large current shown in FIG. 7 basically represents a characteristic in the region where the current value is on and above the line A of FIG. 2(a).

The disturbance transmission characteristic changes in accordance with a gradient value of the assist map. As a general tendency of the assist map, the region in which the gradient value of the assist map starts increasing to be equal to or larger than a given value is determined in accordance with the current value regardless of the vehicle speed.

For example, as the gradient value of the assist map shown in FIG. 2(b), the gradient value is basically 10 A/Nm or smaller on or on the left of the line A and is basically 10 A/Nm or larger on or on the right of the line A. The characteristic shown in FIG. 7 at a small current basically represents a characteristic in the region in which the current value is on or below the line A of the assist map of FIG. 2(a).

Therefore, on the current variable gain map 32, the output is attenuated to zero in the range where the absolute value of the current is A or larger. A value A' at which the variable gain becomes zero is to be set close to A as long as the driver does not perceive a sudden change in the variable gain. For example, the value may be about 1.5 times as large as A.

On the other hand, for the steering-torque signal, as indicated by gradient values of the assist map of the FIGS. 2(a) and 2(c), the region where the gradient is equal to or smaller than 10 A/Nm and the region where the gradient is equal to or larger than 10 A/Nm are both contained in the range between lines B and C depending on the vehicle speed and are not efficiently separated from each other. For example, if a threshold value is provided on the line C, the vibration suppression current is generated in an excess region (B to C) where the gradient of the assist map is large when the vehicle speed is small. Thus, the steering component is increased as a whole, thereby generating the effects on the steering.

On the other hand, if the threshold value is provided on the line B, the vibration suppression current becomes zero in the region (B to C) where the gradient of the assist map is small when the vehicle speed is large. Therefore, the transmission of the vibration due to the disturbance cannot be suppressed.

Therefore, if the variable gain based on the steering-torque signal is to be used in place of that based on the current, the variable gain based on the vehicle speed is required to complicate the computation. Moreover, in the case where the vibration suppression current is not optimally corrected with the current variable gain map 32 in view of the disturbance transmission characteristics, measures to reduce the steering component are required to be taken by providing the dead zone to the vibration suppression control means 22 or the like.

The line A of FIG. 2 is a boundary line at which the gradient is in the vicinity of 10 A/Nm. However, a strict boundary line regardless of the magnitude of the vehicle speed as described above is not required to be provided. Any boundary of the gradient, which is approximately equivalent regardless of the magnitude of the vehicle speed, may be used.

The current Id contains components other than the assist torque current Ia. In general, the assist torque current Ia is dominant. Hence, in the description of the current variable gain Ki given above, the assist torque current is treated as being approximately equivalent to the current. Therefore, as the input current to the current variable gain map 32, the assist torque current Ia may be used.

According to the above-mentioned configuration, as indicated by the broken line of FIG. 7 as an example of the case of the "small current region with control of the present invention", the transmission of the vibration due to the disturbance to the steering wheel is suppressed by the vibration suppression current so that the vibration due to the disturbance is reduced to a level at which the driver scarcely perceives. The broken line of FIG. 7 indicates the case where the variable gain is constantly zero.

The band in which the transmission of the disturbance is reduced by the vibration suppression control ranges from 1 Hz to the vicinity of 20 Hz and contains a part having a frequency similar to that of the steering by the driver (approximately equal to or lower than 5 Hz). The characteristic of the case where the variable suppression control is performed is obtained in the case where the first-order HPF is used as the vibration extracting filter.

Next, FIGS. 8 to 10 show Lissajous curves of the steering angle and the steering torque, each corresponding to a curve showing a basic characteristic of the steering feeling, and time waveforms corresponding thereto according to Embodiment 1 of the present invention. Specifically, FIG. 8 show, in comparison, the case where the vibration suppression control according to the present invention is performed, the case where the vibration suppression control according to the present invention is not performed, and the case where the variable gain is fixed to 1 without the variable gain map. FIG. 8($a$) is a corresponding Lissajous curve, and FIGS. 8($b$) and ($c$) show corresponding time waveforms, each showing a response to the steering at 1 Hz.

FIGS. 9 and 10 show, in comparison, the case where the vibration suppression control according to the present invention is performed and the case where the vibration suppression control according to the present invention is not performed. FIGS. 9($a$) and 10($a$) are corresponding Lissajous curves, and FIGS. 9($b$) and 10($b$) show corresponding time waveforms showing a response to the steering at 0.2 Hz. FIG. 9 show the case where the range of the steering angle is large, whereas FIG. 10 show the case where the range of the steering angle is small.

The Lissajous curves shown herein correspond to the results of experiments, which are obtained when a typical steering method of performing steering so that the angle of the steering wheel changes in a sinusoidal manner. The evaluation of the steering feeling by using the Lissajous curves is a method which is generally often used. The waveforms shown in FIGS. 8 to 10 in the case where the variable suppression control is performed are obtained when the first-order HPF is used as the vibration extracting filter.

When the frequency of the steering is high (for example, the case of the steering at 1 Hz shown in FIG. 8), the region where the rotation speed is higher than $\omega 1$ is large. In the vicinity of counter-steering at which the rotation speed is lowered (in the vicinity of 1.3 seconds of FIG. 8($b$)), the current tends to increase. Therefore, the vibration suppression current becomes approximately zero by the rotation-speed variable gain K$\omega$ and the current variable gain Ki, thereby removing the effects on the steering.

When the frequency of steering is low (for example, the case where the steering is performed at 0.2 Hz shown in FIG. 9 and the range of steering angle is approximately equal to that of the example of the steering at 1 Hz described above), the motor rotation speed is lowered as a whole. Even in the above-mentioned case, however, the range where the rotation speed is $\omega 1$ or higher is large in the case where the range of steering speed is large (about 100 degrees in this case) as shown in FIG. 9. In the vicinity of counter-steering at which the rotation speed is lowered (in the vicinity of three seconds shown in FIG. 9($b$)), the current tends to increase. Therefore, the vibration suppression current becomes approximately zero by the rotation-speed variable gain K$\omega$ and the current variable gain Ki, thereby removing the effects on the steering.

When the frequency of steering is low and the range of steering angle is small (for example, when the steering is performed at 0.2 Hz and the range of angle is about 15 degrees as shown in FIG. 10), the variable gain becomes constantly 1. In such a case, however, the steering torque is small. Therefore, the vibration suppression current is sufficiently reduced only by the vibration extracting filter including the first-order HPF. As shown in FIG. 10($b$), it is understood that the vibration suppression current is only about 0.3 to 0.4 A and therefore, is sufficiently small. Therefore, the effects on the steering can be removed. In this manner, the vibration suppression control does not affect any type of steering.

The case where the variable gain map is not provided (specifically, the variable gain is constantly fixed to 1 and the temporary vibration suppression current is directly used as the vibration suppression current in the configuration of Embodiment 1) is described with reference to FIGS. 8($a$) and ($c$) as an example. When the variable gain map is not provided, the Lissajous curve shown in FIG. 8($a$) has a waveform narrowed in the vicinity of the point of origin as compared with a normal case where the vibration suppression control is not performed, which shows the presence of the effects on the steering.

In terms of the time waveform, the vibration suppression current of about 5 A is generated as shown in FIG. 8($c$), which produces the effects on the steering. Even if some variable gain is provided, the vibration suppression current cannot be sufficiently reduced when the variable gain is not appropriately provided as in the case of Embodiment 1. Therefore, the effects on the steering are sometimes produced.

On the other hand, the above-mentioned configuration (corresponding to the configuration with the vibration suppression control, which is indicated by the solid line shown in FIG. 8($a$)) of Embodiment 1 has approximately the same waveform as that of the case without the vibration suppression control. Therefore, the effects on the steering are scarcely found. Specifically, the steering feeling is not lowered.

As described above, according to Embodiment 1, the control amount calculated by extracting the vibration component from the steering torque is corrected with the variable gain set in accordance with the current and the rotation speed. Further, for setting the variable gain, the variable gain is reduced in the region where the disturbance is unlikely to be transmitted to the steering wheel in view of the transmission characteristic from the disturbance to the steering wheel. As a result, a process of lowering the vibration suppression current in the region where the transmission of the disturbance is small in view of the disturbance transmission characteristic can be carried out without the need of providing the dead zone to the vibration suppression control means.

Further, effective processing can be performed with a simple computation using the minimum necessary filter and variable gain by taking the tendency of the assist map characteristic into consideration. As a result, the effects on the steering are eliminated so as to avoid the degradation of the steering feeling. At the same time, the transmission of the disturbance of the frequency containing the component in the steering frequency band to the steering wheel can be sufficiently suppressed to such a degree that the driver cannot perceive.

In the above-mentioned configuration of Embodiment 1, the rotation-speed detecting means for directly detecting the rotation speed of the motor is used. However, rotation-angle detecting means for detecting a rotation angle of the motor and rotation-speed calculating means for computing the rotation speed from a detected rotation-speed signal may be used in place of the rotation-speed detecting means so as to obtain the rotation-speed signal. Although the rotation-speed calculating means is basically differential, a process with the LPF as the differential to remove high-frequency noise may be used or a filter obtained by multiplying the HPF by the gain may be used as a process equivalent thereto. Even in this case, the same effects as those obtained by the above-mentioned configuration can be obtained.

In the above-mentioned configuration of Embodiment 1, the rotation speed of the motor is detected to obtain the rotation-speed signal. However, the configuration may be such that a rotation speed of the steering wheel is alternatively detected to obtain the rotation-speed signal. Even in this case, the same effects as those of the above-mentioned configuration are obtained.

Moreover, as described above, the assist map shown in FIG. 2 is a general one. It is a general tendency that the assist map has the boundary line having the gradient which does not depend on the vehicle speed as the line A. However, some of those which are not general do not have the boundary line having the gradient which does not depend on the vehicle speed as the line A. In such a case, the variable gain depending on the vehicle speed, as described in the following Embodiment 2, may be additionally introduced. In the case of the method described above, however, the amount of computation is increased by the amount of the variable gain depending on the vehicle speed and becomes complex.

Figure 11:
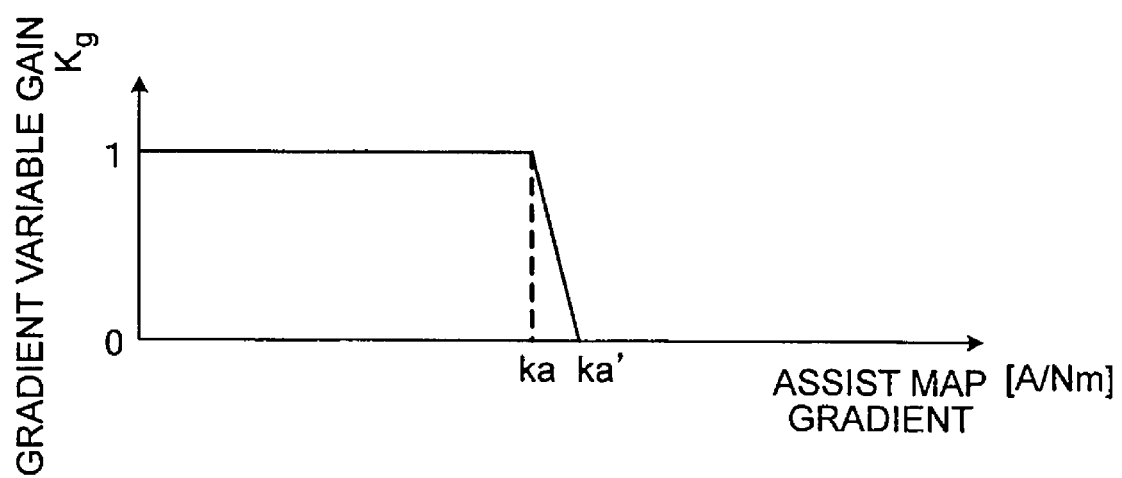
FIG. 11 An input/output characteristic view showing a gradient variable gain map according to a modified example of Embodiment 1 of the present invention.

Alternatively, the gradient of the assist map (corresponding to a third state quantity) may be computed from the steering-torque signal and the assist torque current in place of the current variable gain Ki so as to provide a variable gain (gradient variable gain) based on a value thereof. FIG. 11 is an input/output characteristic view showing a gradient variable gain map in a modified example of Embodiment 1 of the present invention. For example, as shown in FIG. 11, the variable gain map (gradient variable gain map) is set to have a characteristic in which the variable gain is 1 at ka (approximately 10 A/Nm) or smaller and gradually decreases to 0 at ka or larger.

A value ka' at which the variable gain becomes zero is to be set to be close to ka as long as a sudden change in the variable gain is not perceived. For example, the value may be 1.5 times as large as ka. With such a configuration, the effects on the steering can be eliminated to avoid the degradation of the steering feeling as in the case of the above-mentioned configuration. At the same time, the transmission of the disturbance to the steering wheel can be sufficiently suppressed to such an extent that the driver does not perceive.

The method using the gradient variable gain described above computes the gradient value and therefore, is advantageous in that the vibration suppression current can be applied only in a strictly minimum necessary range of the disturbance transmission characteristic. With the above-mentioned method, however, the amount of computation is increased by the amount of computation for the gradient and is complicated as compared with the above-mentioned configuration. The computation of the gradient in this method may be a known one. The gradient can be calculated, for example, by dividing the amount of change in the steering-torque signal by the amount of change in the assist torque current.

Embodiment 2

Figure 12:
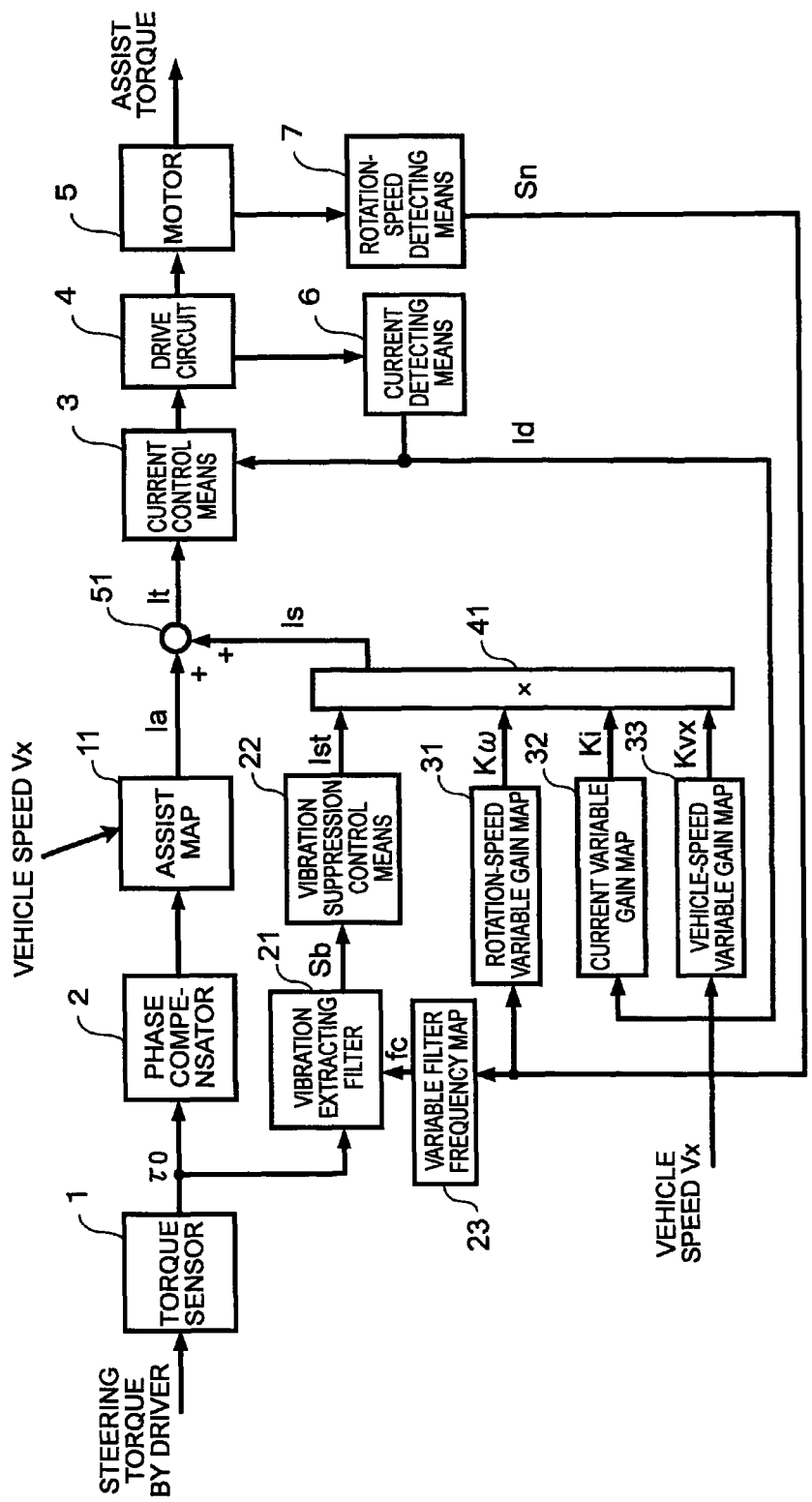
FIG. 12 A block line diagram illustrating a configuration of an electric power steering control device according to Embodiment 2 of the present invention.

FIG. 12 is a block line diagram illustrating a configuration of an electric power steering control device according to Embodiment 2 of the present invention. In comparison with the configuration illustrated in FIG. 1 according to Embodiment 1 described above, the configuration illustrated in FIG. 12 according to Embodiment 2 differs in that a variable filter frequency map 23 and a vehicle-speed variable gain map 33 are added. The configuration other than the added parts is the same as that of Embodiment 1 described above and therefore, the different configuration is mainly described below.

Figure 13:
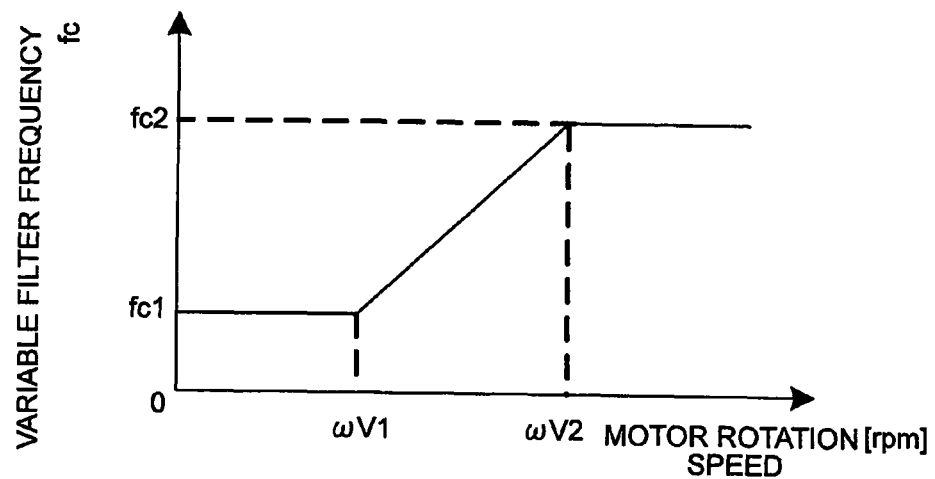
FIG. 13 An input/output characteristic view showing a variable filter frequency map 23 according to Embodiment 2 of the present invention.

First, the variable-filter frequency map 23 is described. FIG. 13 is an input/output characteristic view showing the variable filter frequency map 23 of Embodiment 2 of the present invention. The variable filter frequency map 23 calculates a variable filter frequency fc based on the rotation-speed signal of the motor 5 in accordance with the input/output characteristic shown in FIG. 13. The calculated variable filter frequency fc is supplied to the vibration extracting filter 21 to be used as a filter frequency of the vibration extracting filter 21.

As already described above, it is generally known that the frequency of the disturbance such as the cogging torque generated by the motor 5 and the pulsations generated in synchronization with the teeth of the gear of the electric power steering device becomes higher in proportion to the rotation speed. Therefore, as shown in FIG. 13, the variable filter frequency map 23 is set so that the variable filter frequency fc becomes higher as the rotation speed is higher. For example, when the disturbance such as the cogging torque is to be coped with, the frequency of the disturbance is about 1 to 5 Hz in the region where the motor rotation speed is low, that is, at a speed around ωV1 shown in FIG. 13 (about 10 rpm). Therefore, a variable filter frequency fc1 is set to, for example, 5 Hz.

On the other hand, when the motor rotation speed is higher and is around ωV2 shown in FIG. 13 (in the vicinity of about 50 to 100 rpm), the frequency of the disturbance is about 5 to 15 Hz. Therefore, a variable filter frequency fc2 is set to, for example, about 10 Hz.

With the above-mentioned configuration, the filter characteristic can be set in accordance with the frequency of the disturbance, which can optimize the disturbance transmission characteristic so as to optimally suppress the disturbance component at the time. As a result, the transmission of the disturbance to the steering wheel can be further reduced.

Figure 14:
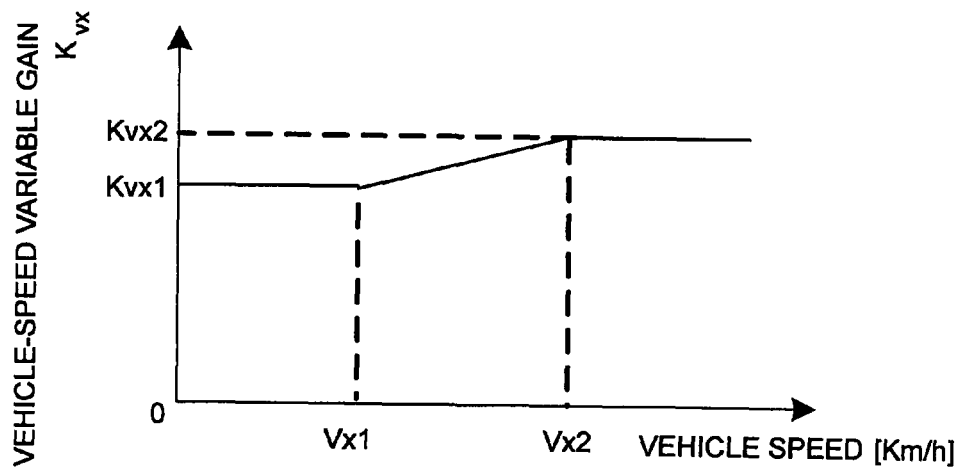
FIG. 14 An input/output characteristic view showing a vehicle-speed variable gain map according to Embodiment 2 of the present invention.

Next, the vehicle-speed gain map 33 is described. The variable gain maps of Embodiment 2 further include the vehicle-speed variable gain map 33 in addition to the rotation-speed variable gain map 31 and the current variable gain map 32. When the vehicle speed is high, the gradient of the assist map tends to be small. Hence, the disturbance is likely to be transmitted to the steering wheel. Therefore, the vehicle-speed variable gain map 33 has an input/output characteristic having a property of increasing a vehicle-speed variable gain Kvx when the vehicle speed is high. FIG. 14 is an input/output characteristic view showing the vehicle-speed variable gain map of Embodiment 2 of the present invention.

The vehicle-speed gain map 33 uses the input/output characteristic shown in FIG. 14 to output a vehicle-speed variable gain in accordance with a vehicle speed Vx (corresponding to a fourth state quantity). Then, a multiplier 41 of Embodiment 2 multiplies the temporary vibration suppression current Ist by three kinds of gain including the rotation-speed variable gain Kω, the current variable gain Ki, and the vehicle-speed variable gain Kvx to calculate the vibration suppression current Is.

For example, when the vehicle speed is low (corresponding to the case of a vehicle speed around Vx1 shown in FIG. 14, specifically, about 20 to 50 Km/h), Kvx1 is set to 1.0. On the other hand, when the vehicle speed is higher (corresponding to the case of a vehicle speed around Vx2 shown in FIG. 14, specifically, about 100 to 200 Km/h), Kvx2 is set to about 1.2. As described above, by setting an appropriate gain in accordance with the vehicle speed, the gain can be increased by the amount of reduction of the gradient of the assist map due to the increase in vehicle speed.

As described above, according to Embodiment 2, in addition to the effects of Embodiment 1 described above, the filter characteristic can be set in accordance with the frequency of the disturbance to optimize the disturbance transmission characteristic so as to optimally suppress the disturbance component at the time by varying the filter frequency in accordance with the motor rotation speed. Further, by setting the appropriate gain in accordance with the vehicle speed, the effects of reducing the disturbance can be compensated for even when the vehicle speed is increased to reduce the gradient of the assist map. Therefore, further satisfactory effects of reducing the disturbance can be obtained.

In Embodiment 2 described above, the case where the variable filter frequency map 23 and the vehicle-speed variable gain map 33 are both provided is described. However, only any one thereof can be added to the configuration illustrated in FIG. 1 of Embodiment 1 described above.

Further, as described above in Embodiment 1, a change in the disturbance transmission characteristic is more effectively coped with by using the current variable gain than by using the steering-torque variable gain as in the related technology because the current variable gain corresponds to the assist gradient which does not depend on the vehicle speed. However, when the vehicle-speed variable gain is provided as in Embodiment 2, a difference in the disturbance transmission characteristic can be absorbed by complicating the vehicle-speed variable gain. Therefore, in the configuration of Embodiment 2, the steering-torque variable gain can be used in place of the current variable gain.

In this case, the addition of the vehicle-speed variable gain and the complication of the gain map complicates the computation. However, as in the case where the current variable gain is used, the effects of suppressing the vibration due to the disturbance and the effects of removing the effects on the steering can be obtained.

Embodiment 3

In Embodiment 1 described above, the case where the vibration extracting filter 21 is used for the steering-torque signal so as to perform the vibration suppression control is described. On the other hand, in Embodiment 3, a case where the vibration extracting filter 21 is used for the rotation-speed signal detected by the rotation-speed detecting means so as to perform the vibration suppression control is described.

Figure 15:
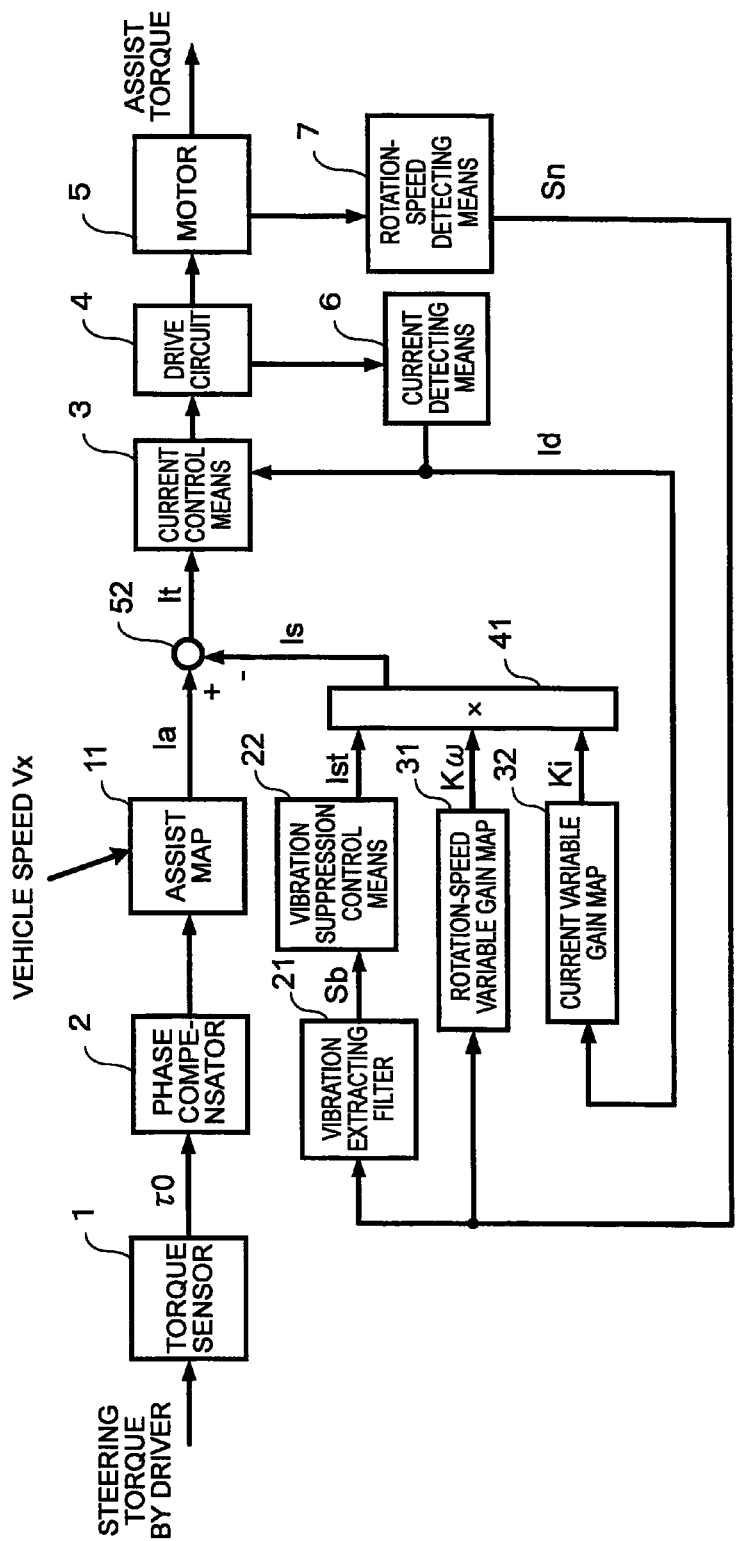
FIG. 15 A block line diagram illustrating a configuration of an electric power steering control device according to Embodiment 3 of the present invention.

FIG. 15 is a block line diagram illustrating a configuration of an electric power steering control device according to Embodiment 3 of the present invention. Embodiment 3 has the same configuration as that of Embodiment 1 described above except that a signal to be input to the vibration extracting filter 21 is the rotation-speed signal and the adder 51 is replaced by a subtracter 52. Therefore, the same operation as that of the Embodiment 1 described above other than an operation of subtracting the vibration suppression current from the assist torque signal is performed. However, the magnitude of the proportional gain of the vibration suppression control means 22 is changed by the amount of change of the signal level, which is caused by replacing the steering-torque signal by the rotation-speed signal.

As described above, according to Embodiment 3, the vibration extracting filter for performing filter processing on the rotation speed of the motor in place of the steering torque to reduce the gain on the low frequency side so as to output the vibration-component signal is provided. Even with the configuration as described above, the effects can be similarly obtained as in Embodiment 1 described above. Specifically, the control amount calculated by extracting the vibration component from the rotation speed in place of the steering torque is corrected with the variable gain set in accordance with the current and the rotation speed. Further, for setting the variable gain, the variable gain is reduced in the region where the disturbance is unlikely to be transmitted to the steering wheel in view of the transmission characteristic from the disturbance to the steering wheel. As a result, the process of reducing the vibration suppression current in the region where the transmission of the disturbance is small in view of the disturbance transmission characteristic can be carried out without the need of providing the dead zone to the vibration suppression control means.

Further, in view of the tendency of the assist map characteristics, effective processing can be performed by a simple computation with the minimum necessary filter and variable gain. As a result, the effects on the steering can be eliminated to avoid the deterioration of the steering feeling. At the same time, the transmission of the disturbance of the frequency containing the component in the steering frequency band to the steering wheel can be sufficiently suppressed to such an extent that the driver does not perceive.

In the configuration according to Embodiment 1 described above, the rotation-speed detecting means for directly detecting the rotation speed of the motor is used. However, the rotation-speed signal may be obtained by using the rotation-angle detecting means for detecting the rotation angle of the motor and the rotation-speed calculating means for computing the rotation speed from the detected rotation angle signal in place of the rotation-speed detecting means. The rotation-speed calculating means is basically differential. However, a process with the LPF as the differential to remove high-frequency noise may be used or a filter obtained by multiplying the HPF by the gain may be used as a process equivalent thereto. Even in this case, the same effects as those of the configuration described above are obtained.

In the configuration according to Embodiment 1 described above, the rotation speed of the motor is detected to obtain the rotation-speed signal. However, the configuration may be such that the rotation speed of the steering wheel is detected to obtain the rotation-speed signal. Even in this case, the same effects as those of the configuration described above are obtained.

For the configuration according to Embodiment 3 described above, the case where the vibration extracting filter and the vibration suppression control are used for the rotation-speed signal calculated from the detection signal of the rotation speed or the rotation angle has been described. However, the vibration extracting filter and the vibration suppression control can also be used for an estimate signal of the rotation speed, which is estimated by a known observer or the like.

Embodiment 4

Figure 16:
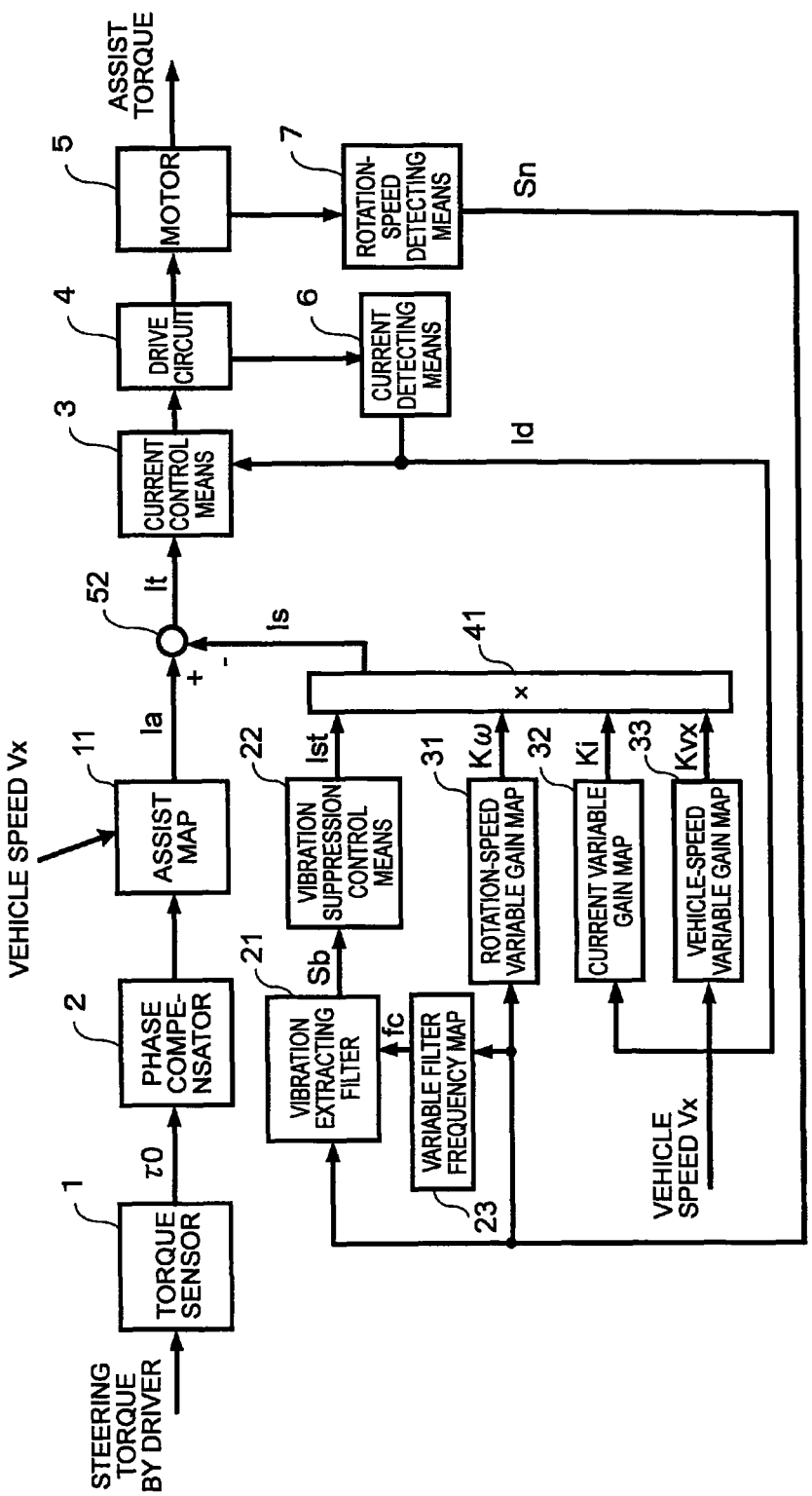
FIG. 16 A block line diagram illustrating a configuration of an electric power steering control device according to Embodiment 4 of the present invention.

FIG. 16 is a block line diagram illustrating a configuration of an electric power steering control device according to Embodiment 4 of the present invention. In comparison with the configuration illustrated in FIG. 15 according to Embodiment 3 described above, the configuration illustrated in FIG. 16 according to Embodiment 4 differs in that the variable filter frequency map 23 and the vehicle-speed variable gain map 33 are added. The configuration other than the added parts is the same as that of Embodiment 1 described above and therefore, the different configuration is mainly described below.

In Embodiment 4, the configuration is the same as that of Embodiment 2 described above except that the signal to be input to the vibration extracting filter 21 is the rotation-speed signal and the adder 51 is replaced by the subtracter 52. Therefore, the same operation as that of Embodiment 2 described above is performed other than the operation of subtracting the vibration suppression current from the assist torque current. However, the magnitude of the proportional gain of the vibration suppression control means 22 is changed by the amount of change of the signal level, which is generated by replacing the steering-torque signal by the rotation-speed signal.

As described above, according to Embodiment 4, the vibration extracting filter for performing the filter processing on the rotation speed of the motor in place of the steering torque to reduce the gain on the low frequency side so as to output the vibration-component signal is provided. Even with the configuration described above, the effects are also obtained as in the case of Embodiment 2 described above. Specifically, the filter characteristic can be set in accordance with the frequency of the disturbance to optimize the disturbance transmission characteristic so as to optimally suppress the disturbance component at the time by varying the filter frequency in accordance with the motor rotation speed. Further, by setting the appropriate gain in accordance with the vehicle speed, the effects of reducing the disturbance can be compensated for even when the vehicle speed is increased to reduce the gradient of the assist map. Therefore, further satisfactory effects of reducing the disturbance can be obtained.

In Embodiment 4 described above, the case where the variable filter frequency map 23 and the vehicle-speed variable gain map 33 are both provided is described. However, only any one thereof can be added to the configuration illustrated in FIG. 15 of Embodiment 3 described above.

As described above in Embodiment 1, a change in the disturbance transmission characteristic is more effectively coped with by using the current variable gain than by using the steering-torque variable gain as in the related technology because the current variable gain corresponds to the assist gradient which does not depend on the vehicle speed. However, when the vehicle-speed variable gain is included as in Embodiment 2, a difference in the disturbance transmission characteristic can be absorbed by complicating the vehicle-speed variable gain. Therefore, in the configuration of Embodiment 2, the steering-torque variable gain can be used in place of the current variable gain.

In this case, the addition of the vehicle-speed variable gain and the complication of the gain map complicates the computation. However, as in the case where the current variable gain is used, the effects of suppressing the vibration due to the disturbance and the effects of removing the effects on the steering can be obtained.

For the configuration according to Embodiment 4 described above, the case where the vibration extracting filter and the vibration suppression control are used for the rotation-speed signal calculated from the detection signal of the rotation speed or the rotation angle has been described. However, the vibration extracting filter and the vibration suppression control can also be used for an estimate signal of the rotation speed, which is estimated by a known observer or the like.

The invention claimed is:

1. An electric power steering control device, comprising:
   an assist map for outputting an assist torque current based on a steering torque applied to a steering wheel by a driver;
   a vibration extracting filter for performing filter processing on the steering torque or a rotation speed of a motor of the electric power steering control device for generating an assist torque to reduce a gain on a low frequency side so as to output a vibration-component signal;
   a current variable gain map for detecting a current flowing through the motor as a first state quantity so as to calculate a current variable gain based on the current;
   a rotation-speed variable gain map for detecting the rotation speed of the motor or a rotation speed of the steering wheel as a second state quantity so as to calculate a rotation-speed variable gain based on the rotation speed;
   correction means for calculating a vibration suppression current based on the vibration-component signal, the current variable gain, and the rotation-speed variable gain; and
   current control means for calculating a signal obtained by correcting the assist torque current with the vibration suppression current as a target current so as to control the current flowing through the motor,
   wherein:
   the current variable gain map receives an input of the detected current flowing through the motor and outputs the current variable gain to be a constant positive value when the detected current is at or below a first predetermined value, outputs the current variable gain according to a gradually decreasing function when the detected current is above the first predetermined value but below a second predetermined value, and outputs the current variable gain to be zero when the detected current is at or above the second predetermined value, wherein the value of the detected current above the first predetermined value corresponds to a predetermined range of the current where a disturbance transmission characteristic indicating an amplification factor of transmission from a disturbance to the steering wheel has a small value; and
   the rotation-speed variable gain map receives an input of the rotation speed of the motor or a rotation speed of the steering wheel and outputs the rotation speed variable gain to be a constant positive value when the detected rotation speed is at or below a third predetermined value, outputs the rotation speed variable gain according to a gradually decreasing function when the detected rotation speed is above the third predetermined value but below a fourth predetermined value, and outputs the rotation speed variable gain to be zero when the detected rotation speed is at or above the fourth predetermined value, wherein the value of the detected rotation speed above the third predetermined value corresponds to a predetermined range of the rotation speed where the disturbance transmission characteristic has a small value.

2. An electric power steering control device according to claim 1, wherein the variable gain map further includes a vehicle-speed variable gain map for detecting a vehicle speed corresponding to a running speed of a vehicle as a fourth state quantity so as to increase and output a vehicle-speed variable gain when the vehicle speed is high and the electric power steering control device outputs a value obtained by further multiplying the already calculated variable gain by the vehicle-speed variable gain as a variable gain.

3. An electric power steering control device according to claim 1, further comprising a variable filter frequency map for calculating a variable filter frequency in accordance with the rotation speed,
wherein the vibration extracting filter varies a filter frequency in accordance with the variable filter frequency calculated by the variable filter frequency map.

4. An electric power steering control device according to claim 1, further comprising a variable filter frequency map for calculating a variable filter frequency in accordance with the rotation speed,
wherein the vibration extracting filter varies a filter frequency in accordance with the variable filter frequency calculated by the variable filter frequency map.

5. An electric power steering control device according to claim 2, further comprising a variable filter frequency map for calculating a variable filter frequency in accordance with the rotation speed,
wherein the vibration extracting filter varies a filter frequency in accordance with the variable filter frequency calculated by the variable filter frequency map.

6. An electric power steering control device, comprising:
an assist map for outputting an assist torque current based on a steering torque applied to a steering wheel by a driver;
a vibration extracting filter for performing filter processing on the steering torque or a rotation speed of a motor of the electric power steering control device for generating an assist torque to reduce a gain on a low frequency side so as to output a vibration-component signal;
a gradient variable gain map for detecting a gradient of the assist torque current with respect to the steering torque on the assist map as a third state quantity so as to output a gradient variable gain based on the gradient;
a rotation-speed variable gain map for detecting the rotation speed of the motor or a rotation speed of the steering wheel as a second state quantity so as to output a rotation-speed variable gain based on the rotation speed;
correction means for calculating a vibration suppression current based on the vibration-component signal, the gradient variable gain, and the rotation-speed variable gain; and
current control means for calculating a signal obtained by correcting the assist torque current with the vibration suppression current as a target current so as to control a current flowing through the motor,
wherein:
the gradient variable gain map receives an input of the detected gradient of the assist torque current with respect to the steering torque on the assist map and outputs the gradient variable gain to be a constant positive value when the detected gradient is at or below a first predetermined value, outputs the gradient variable gain according to a gradually decreasing function when the detected gradient is above the first predetermined value but below a second predetermined value, and outputs the gradient t variable gain to be zero when the detected gradient is at or above the second predetermined value, wherein the value of the detected gradient above the first predetermined value corresponds to a predetermined range of the gradient where a disturbance transmission characteristic indicating an amplification factor of transmission from a disturbance to the steering wheel has a small value; and
the rotation-speed variable gain map receives an input of the rotation speed of the motor or a rotation speed of the steering wheel and outputs the rotation speed variable gain to be a constant positive value when the detected rotation speed is at or below a third predetermined value, outputs the rotation speed variable gain according to a gradually decreasing function when the detected rotation speed is above the third predetermined value but below a fourth predetermined value, and outputs the rotation speed variable gain to be zero when the detected rotation speed is at or above the fourth predetermined value, wherein the value of the detected rotation speed above the third predetermined value corresponds to a predetermined range of the rotation speed where the disturbance transmission characteristic has a small value.

7. An electric power steering control device according claim 6, wherein the variable gain map further includes a vehicle-speed variable gain map for detecting a vehicle speed corresponding to a running speed of a vehicle as a fourth state quantity so as to increase and output a vehicle-speed variable gain when the vehicle speed is high and the electric power steering control device outputs a value obtained by further multiplying the already calculated variable gain by the vehicle-speed variable gain as a variable gain.

8. An electric power steering control device according to claim 6, further comprising a variable filter frequency map for calculating a variable filter frequency in accordance with the rotation speed,
wherein the vibration extracting filter varies a filter frequency in accordance with the variable filter frequency calculated by the variable filter frequency map.

9. An electric power steering control device according to claim 7, further comprising a variable filter frequency map for calculating a variable filter frequency in accordance with the rotation speed,
wherein the vibration extracting filter varies a filter frequency in accordance with the variable filter frequency calculated by the variable filter frequency map.

* * * * *